UNITED STATES PATENT OFFICE.

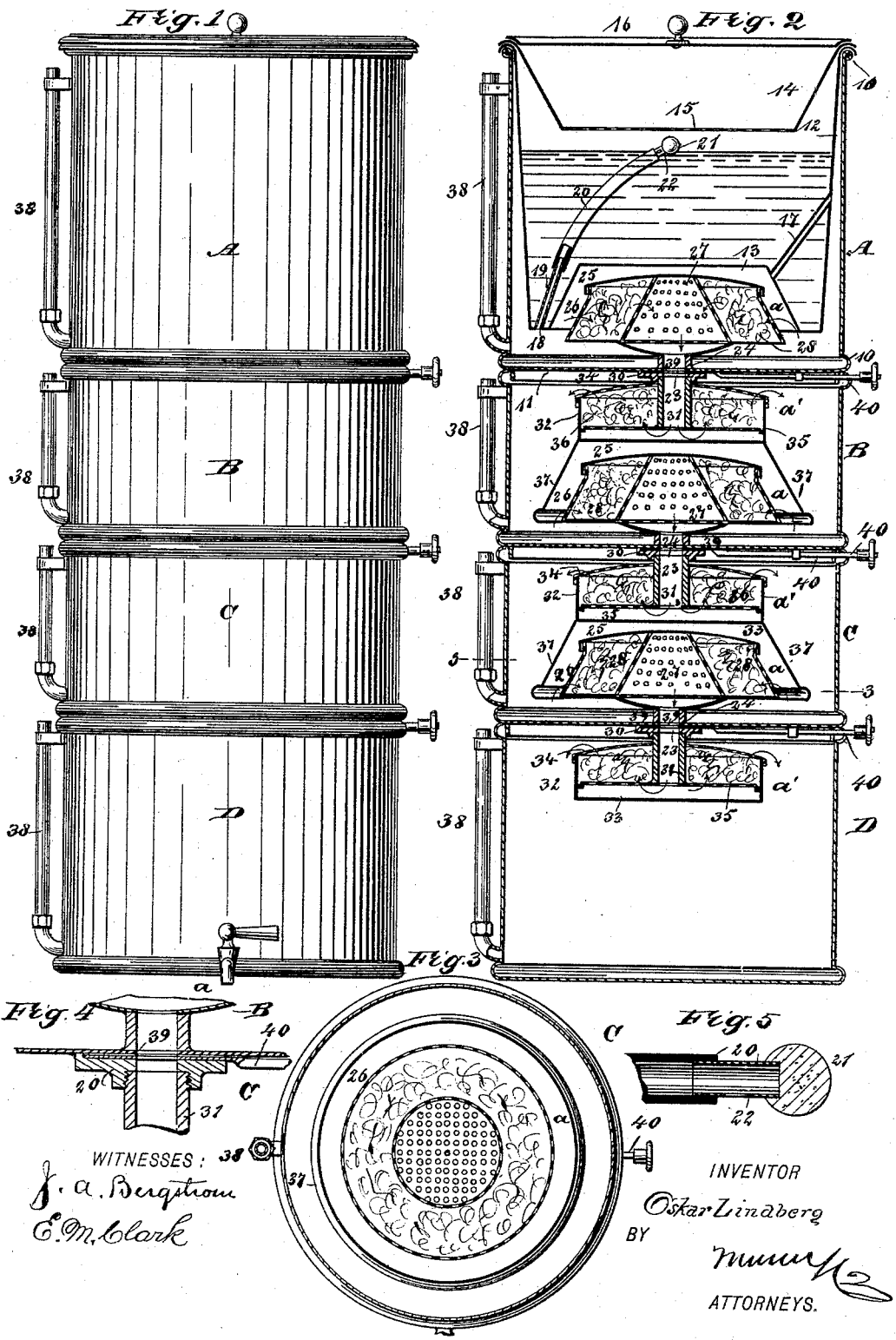

OSKAR LINDBERG, OF HELSINGBORG, SWEDEN, ASSIGNOR OF ONE-HALF TO JOHAN E. SANDELIN, OF NEW YORK, N. Y.

OIL-FILTER.

SPECIFICATION forming part of Letters Patent No. 487,421, dated December 6, 1892.

Application filed June 18, 1892. Serial No. 437,192. (No model.) Patented in Sweden March 12, 1891, No. 2,868; in Norway April 29, 1891, No. 2,077, and in Denmark April 29, 1891.

*To all whom it may concern:*

Be it known that I, OSKAR LINDBERG, a subject of the King of Sweden and Norway, residing at Helsingborg, Sweden, have invented a new and useful Improvement in Oil-Filters, (patented in Sweden March 12, 1891, No. 2,868; in Norway April 29, 1891, No. 2,077, and in Denmark April 29, 1891,) of which the following is a full, clear, and exact description.

My invention relates to an improvement in filters especially adapted for filtering oil, and has for its object to provide a device which will be exceedingly simple, durable, and economic, and so constructed that the oil when placed in the upper portion of the device will after percolating through various layers of filtering material and strainers reach the bottom of the device thoroughly cleansed from all impurities or of such impurities which would render it in the slightest degree undesirable.

A further object of the invention is to provide the device with a series of valves whereby the flow of oil may be stopped at predetermined points in the length of the filter, and whereby, also, the filter will be a sectional one capable of being readily and expeditiously taken apart, cleaned, and repaired and put in position again.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of the filter. Fig. 2 is a central vertical section. Fig. 3 is a transverse section taken, practically, on the line 3 3 of Fig. 2. Fig. 4 is a sectional detail view of the inner construction of a section of the filter, and Fig. 5 is a sectional view of the supply-tube of the filter.

The filter is made in a number of sections. Four sections are shown, the upper one being designated as A, the next as B, the third as C, and the final section as D. Each section is preferably strengthened both at top and bottom by a bead 10 or the equivalent thereof, and each section is open at the top, but is provided with a closed bottom; and, furthermore, each section of the filter above the lower section is provided with a base-flange 11, which when the sections are placed one upon the other assume the position shown in Fig. 2—that is, the flange of the upper section extends downward within the section below it. The upper section A is the receiving-section, and in it is suspended a reservoir 12, consisting of a pan tapered somewhat in direction of its lower end, the pan being flared outward at its upper end, so that it may rest upon the upper bead 10 of the upper section, and in the bottom of the reservoir 12 at its center a depression 13 is produced, the depression partaking somewhat of the shape of a truncated cone. In the reservoir at the upper portion thereof a pan 14 is supported, the bottom of which pan consists of a strainer 15, and this pan at its upper end is outwardly flared, so that it may be supported upon the upper portion of the reservoir, and the entire upper portion is closed at the top, when it may be desired, through the medium of a cover 16, which fits in the strainer-pan 14. There is likewise a vent-tube 17, located in the reservoir, leading out through one side and into the depression 13. At one side of the depression 13 an outlet-opening 18 is produced in the reservoir, and this opening is surrounded by a tube 19, extending upward within the reservoir and having attached to it a section of flexible tubing 20, provided at its upper end with a float 21 and with an inlet 22 adjacent to the float. The oil to be filtered is first passed through the strainer 15 of the upper pan 14, from whence it finds its way into the reservoir 12 and into the flexible tubing 20, through the opening 22 therein, and from the tubing out through the outlet-aperture 18.

It will be observed that by employing the flexible tubing and the float the oil may be quite low in the reservoir 12, yet will flow out therefrom as readily as though the reservoir were practically filled.

In the central portion of the bottom of the upper section A an opening 23 is made. This opening is surrounded by a tube 24, extending within the reservoir, and this tube supports a circular filter $a$. This filter consists of outer casing shaped somewhat as a truncated cone, the casing being of sufficient size to readily enter the depression 13 in the bottom of the reservoir. The top and bottom portions of the casing (said casing being designated as 25) are solid—that is, are constructed with an unbroken surface; but the sides 26 of the casing are either perforated or reticulated and constitute a strainer. The bottom of the casing connects directly with the tube 24, secured to the bottom of the upper section, and has direct communication with that tube.

Within the casing 25, at its center, a conical strainer 27 is located, extending from the top practically to the bottom. A space is formed, however, at the bottom of the strainer, as the strainer is provided with a bottom, as shown in Fig. 2, between said bottom and the mouth of the tube 24, while within the casing, around the strainer 27, a packing of waste or other filtering material (designated by the numeral 28) is placed, practically filling that portion of the casing. The top of the casing is made removable in order that this packing may be removed when necessary and other packing substituted.

Around the opening 23 a socket 30 is secured upon the bottom of the upper section A, as shown in the detail view, Fig. 4, and into this socket a tube 31 is screwed or otherwise removably secured, which tube is adapted to extend downward some distance within the next section B. This tube supports a second strainer-casing $a'$, the casing being attached to the tube. The casing consists of plain sides 32, of metal or of any approved material, circular in general contour, a plain bottom 33, a removable perforated or reticulated tube 34, which serves as a strainer, and a horizontal strainer 35, located within the casing a slight distance above its bottom 33. The tube 31 extends through the top strainer 34, and is secured at its lower end to the inner horizontal strainer 35. The space within the strainer-casing, between the inner strainer 35 and the top strainer 34, is filled with a packing of filtering material, such as waste, the material being designated by the reference-numeral 36. The strainer-casing $a'$ is provided with a downwardly-extending bell or inverted-funnel-shaped extension-casing 37. This casing is open at its lower end, and is strengthened at that end by a rib.

The second section B is provided with a strainer-casing $a$ within it and a strainer-section $a'$ below it, these two casings and their connections being identical with the strainer and connections of the upper sections, and therefore I have designated them by the same reference-letters.

The upper strainer-casing $a$ of the filter-section B enters the funnel extension 37 of the upper section, and is of considerably less diameter and height than the said funnel extension, while the funnel extension 37 of the filter-section B receives the strainer-casing $a$ of the third filter-section C, the lower strainer-casing $a'$ of the said filter-section C being adapted to extend downward within the lower or last section D of the filter; but this lowermost strainer-casing $a'$ is not provided with the funnel extension 37, described in connection with the casings above.

Each section of the filter is provided with a gage-tube 38, exteriorly located, so that the amount of oil contained in each filter-section may be readily ascertained. Any one of the sections may be removed from the filter and their number may be increased or diminished, as may be found in practice desirable, and communication between each section of the filter may be cut off through the medium of slide-valves 39, having horizontal movement between the tubes 31 and 24 of the sections, as is best shown in Fig. 4, these valves being controlled by attached stems 40, which extend beyond the outer face of the filter, and are provided with knobs or other forms of handles.

The course of the oil from the reservoir 12 to the bottom section D of the filter is as follows: The valve being opened, as shown in Figs. 2 and 4, the oil after passing from the outlet 18 of the reservoir will rise in the bottom of the upper section A. It will then enter the strainer-casing in that section through the sides of the casing, as indicated by the arrows, and after passing through the filtering material 28 will find its way into the central strainer 27, from whence it will pass down through the tubes 24 and 31 into the bottom of the body portion of the lower strainer-casing $a'$. As the oil fills up this portion of the strainer-casing it passes up through the filtering material 30 contained in that casing and out through its perforated top. After passing through this top strainer 34 the oil follows the downward course of the pendent funnel 37 until it reaches the bottom of the filter-section B, and as it fills up in the bottom of this section it enters the upper strainer-casing of the section B through its sides in the same manner as it entered the corresponding strainer-casing of the upper filter-section, and this route of the oil is maintained or pursued until the oil reaches the lowermost strainer-casing $a'$, from which it passes through the top strainer 34 and drops into the lowermost filter-section D freed from all its impurities. This filter is not only simple and durable in its construction, but it is exceedingly practical and will remove all impurities from oil passed through it.

The oil, as has heretofore been stated, may be prevented from passing from one filter-section to the other by closing the valves 39. If the oil is very impure or mixed with water, it should be permitted to stand awhile and settle, and the filter is preferably placed near some object by which it may be heated to some extent.

Having thus described my invention, I claim as new and desire to secure by Letters Patent—

1. In a filter, the combination, with the body constructed of superposed sections, of an oil-reservoir arranged in the first section and having an outlet, a flexible tube connected with said outlet and having a float-controlled inlet, and two filters located one in one section and the other in the next and connected by a passage, as shown and described.

2. In a filter, the combination, with the body portion thereof constructed in sections, one detachable from the other, and a reservoir contained in the first section, having an outlet and a flexible tube connected with the outlet and having a float-controlling inlet, of a filter comprising strainer-casings, connected by a tube, one casing being located in the upper section of the body and the other filter-casing in the next lower section, interior strainers contained in the strainer-casings, and a valve held to slide in the two strainer-casings, whereby communication between them may be cut off or established, as and for the purpose set forth.

3. In an oil-filter, the combination, with a body constructed in sections, the upper section being provided with a closed bottom and an open top, as is likewise the next section below the upper section, the sections being removably connected, a reservoir located within the upper section of less diameter at its lower end than the lower diameter of the section, the said reservoir being provided with an outlet, and a flexible tube connected with the outlet, having an inlet-opening and carrying a float, of strainer-casings located one in each of the sections, a tube connecting the strainer-casings, each strainer-casing being provided with a removable top, the upper strainer-casing having only its sides perforated and provided with an interior strainer communicating with the connecting-tube between the upper and lower casings, and a packing of filtering material between the strainer and perforated sides, the lower strainer-casing having only its removable top perforated and provided with an inner strainer, and a packing of filtering material between the two strainer-surfaces, substantially as shown and described.

4. In an oil-filter, the combination, with a body constructed in sections, the upper section being provided with a closed bottom and an open top, as is likewise the next section below the upper section, the sections being removably connected, a reservoir located within the upper section of less diameter at its lower end than the lower diameter of the section, the said reservoir being provided with an outlet, and a flexible tube connected with the outlet, having an inlet-opening and carrying a float, of strainer-casings located one in each of the sections, a tube connecting the strainer-casings, each strainer-casing being provided with a removable top, the upper strainer-casing having only its sides perforated, and provided with an interior strainer communicating with the connecting-tube between the upper and lower casings, and a packing of filtering material between the strainer and perforated sides, the lower strainer-casing having only its removable top perforated and provided with an inner strainer, a packing of filtering material between the two strainer-surfaces, a valve having sliding movement between the upper and the lower strainer-casings, and an essentially-bell-shaped extension formed upon the lower portion of the lower strainer-casing, substantially as shown and described, and for the purpose specified.

OSKAR LINDBERG.

Witnesses:
KARL FORNSTRÖM,
PETTER JACOBSON.